US011373004B2

United States Patent
Nitsan et al.

(10) Patent No.: US 11,373,004 B2
(45) Date of Patent: Jun. 28, 2022

(54) REPORT COMPRISING A MASKED VALUE

(71) Applicant: MICRO FOCUS LLC, Santa Clara, CA (US)

(72) Inventors: Amichai Nitsan, Rehovot (IL); Michael Gopshtein, Yehud (IL); Hana Giat, Yehud (IL); Adi Lipin, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 51 days.

(21) Appl. No.: 16/892,110

(22) Filed: Jun. 3, 2020

(65) Prior Publication Data

US 2020/0293688 A1 Sep. 17, 2020

Related U.S. Application Data

(62) Division of application No. 15/511,986, filed as application No. PCT/US2014/057544 on Sep. 25, 2014, now Pat. No. 10,754,977.

(51) Int. Cl.
| | |
|---|---|
| *G06F 21/62* | (2013.01) |
| *G06F 11/30* | (2006.01) |
| *G06F 21/00* | (2013.01) |
| *G06F 21/55* | (2013.01) |
| *H04L 43/06* | (2022.01) |
| *G06F 11/34* | (2006.01) |

(52) U.S. Cl.
CPC .......... *G06F 21/6245* (2013.01); *G06F 11/30* (2013.01); *G06F 11/3065* (2013.01); *G06F 21/00* (2013.01); *G06F 21/552* (2013.01); *G06F 21/6254* (2013.01); *H04L 43/06* (2013.01); *G06F 11/3438* (2013.01); *G06F 2201/86* (2013.01)

(58) Field of Classification Search
CPC ...... G06F 21/6245; G06F 11/30; G06F 21/00; G06F 11/3065; G06F 21/552; G06F 21/6254; G06F 43/06; G06F 2201/86; G06F 11/3438
See application file for complete search history.

(56) References Cited

U.S. PATENT DOCUMENTS

| | | | |
|---|---|---|---|
| 6,122,189 A | 9/2000 | Batra | |
| 6,125,390 A * | 9/2000 | Touboul | G06F 11/0709 709/223 |

(Continued)

FOREIGN PATENT DOCUMENTS

WO WO-2005010792 2/2005

OTHER PUBLICATIONS

International Searching Authority, The International Search Report and the Written Opinion, dated May 27, 2015, 11 Pages.

(Continued)

*Primary Examiner* — Abu S Sholeman

(57) ABSTRACT

Examples disclosed herein relate, among other things, to an apparatus that includes a processor and a non-transitory machine-readable medium on which is stored instructions that, when executed by the processor, cause the processor to generate a report, the report including a value, access a memory, the memory storing indications of whether values are to be masked, determine that the value is to be masked based on the accessed memory, and substitute the value in the report with a masked value.

19 Claims, 4 Drawing Sheets

(56) References Cited

U.S. PATENT DOCUMENTS

| | | |
|---|---|---|
| 8,024,339 B2 | 9/2011 | Barker et al. |
| 8,473,751 B2 | 6/2013 | Rivain |
| 8,539,024 B2 | 9/2013 | Smit et al. |
| 8,713,656 B2 | 4/2014 | Nandakumar |
| 8,798,273 B2 | 5/2014 | Rich et al. |
| 8,816,370 B2 | 8/2014 | Song |
| 8,924,852 B2 | 12/2014 | Ikawa |
| 9,135,315 B2 | 9/2015 | Barbas |
| 10,423,807 B2 | 9/2019 | Jaffe |
| 2003/0233546 A1* | 12/2003 | Blom ............... H04L 9/3213 713/168 |
| 2005/0080983 A1* | 4/2005 | Chung ............ G06F 13/4234 711/100 |
| 2005/0240558 A1 | 10/2005 | Gil et al. |
| 2006/0125664 A1 | 6/2006 | Liardet |
| 2008/0065655 A1 | 3/2008 | Pomroy et al. |
| 2008/0071686 A1 | 3/2008 | Tayebi |
| 2008/0216174 A1 | 9/2008 | Vogel |
| 2010/0205189 A1 | 8/2010 | Ebrahimi et al. |
| 2011/0191673 A1 | 8/2011 | Ikawa |
| 2011/0264920 A1 | 10/2011 | Rieffel et al. |
| 2011/0314278 A1 | 12/2011 | Taskaya |
| 2012/0246696 A1 | 9/2012 | Boukobza |
| 2012/0259877 A1* | 10/2012 | Raghunathan ...... G06F 21/6254 707/757 |
| 2013/0166920 A1 | 6/2013 | Cousins et al. |
| 2014/0019467 A1 | 1/2014 | Itoh et al. |
| 2014/0019756 A1 | 1/2014 | Krajee |
| 2014/0047521 A1* | 2/2014 | Henderson ............ G06F 21/45 726/6 |
| 2014/0123303 A1* | 5/2014 | Shukla ............... G06F 21/6254 726/26 |
| 2014/0172806 A1 | 6/2014 | Wilding |
| 2014/0281425 A1* | 9/2014 | Valentine ........... G06F 9/30036 712/225 |
| 2015/0096037 A1* | 4/2015 | Padmanabhan ..... G06F 21/6245 726/26 |
| 2015/0098564 A1 | 4/2015 | Chamley |
| 2015/0324607 A1 | 11/2015 | Mushkatblat |
| 2017/0293773 A1* | 10/2017 | Nitsan .................... H04L 43/06 |
| 2019/0095644 A1* | 3/2019 | Park ..................... H04L 63/101 |

OTHER PUBLICATIONS

Meier, J.D. et al., Chapter 4—Design Guidelines for Secure Web Applications, Jun. 2003, 20 pages http://msdn.rnicrosoft.com/en-us/library/ff648647.aspx.

* cited by examiner

210 — Username = john1985
Device ID = E885543FB190
Event time = 1:17 PM, August 31, 2014
Event type = button_clicked
Screen name = "My Accounts"
Component ID = btnShowAccountDetails
Display value = "John Doe account ending in '9876 (balance $1,234)"
Response time = 1.4 (sec)

*FIG. 2A*

220 — Username = john1985
Device ID = E885543FB190
Event time = 1:17 PM, August 31, 2014
Event type = button_clicked
Screen name = "My Accounts"
Component ID = btnShowAccountDetails
Display Value = "#B384FDA8 #334D8B012 account ending in #98874BC3 (balance #F4D2234B)"
Response time = 1.4 (sec)

*FIG. 2B*

REPORT COMPRISING A MASKED VALUE

RELATED APPLICATIONS

This application claims priority to and is a divisional application of U.S. patent application Ser. No. 15/511,986, filed Mar. 16, 2017, which is a U.S. National Stage Entry of PCT Application No. PCT/US2014/057544, filed Sep. 25, 2014, both of which are incorporated herein by reference in their entireties.

BACKGROUND

Developers of mobile, web, desktop or other types of software applications often desire to obtain information about the application's performance, failures, usability, user preferences, and so forth. Such information may be used, for example, to fix any issues related to the application, better identify and address user behavior and preferences, etc. Accordingly, various testing and monitoring tools have been developed to allow collecting such information from multiple users and devices. The tools may compile, process and present the information to developers or other users in a meaningful way.

BRIEF DESCRIPTION OF THE DRAWINGS

The following detailed description references the drawings, wherein:

FIG. 2A illustrates an example generated report;

FIG. 2B illustrates the example generated report of FIG. 2A having masked values, in accordance with some examples;

DETAILED DESCRIPTION

Figure 1:
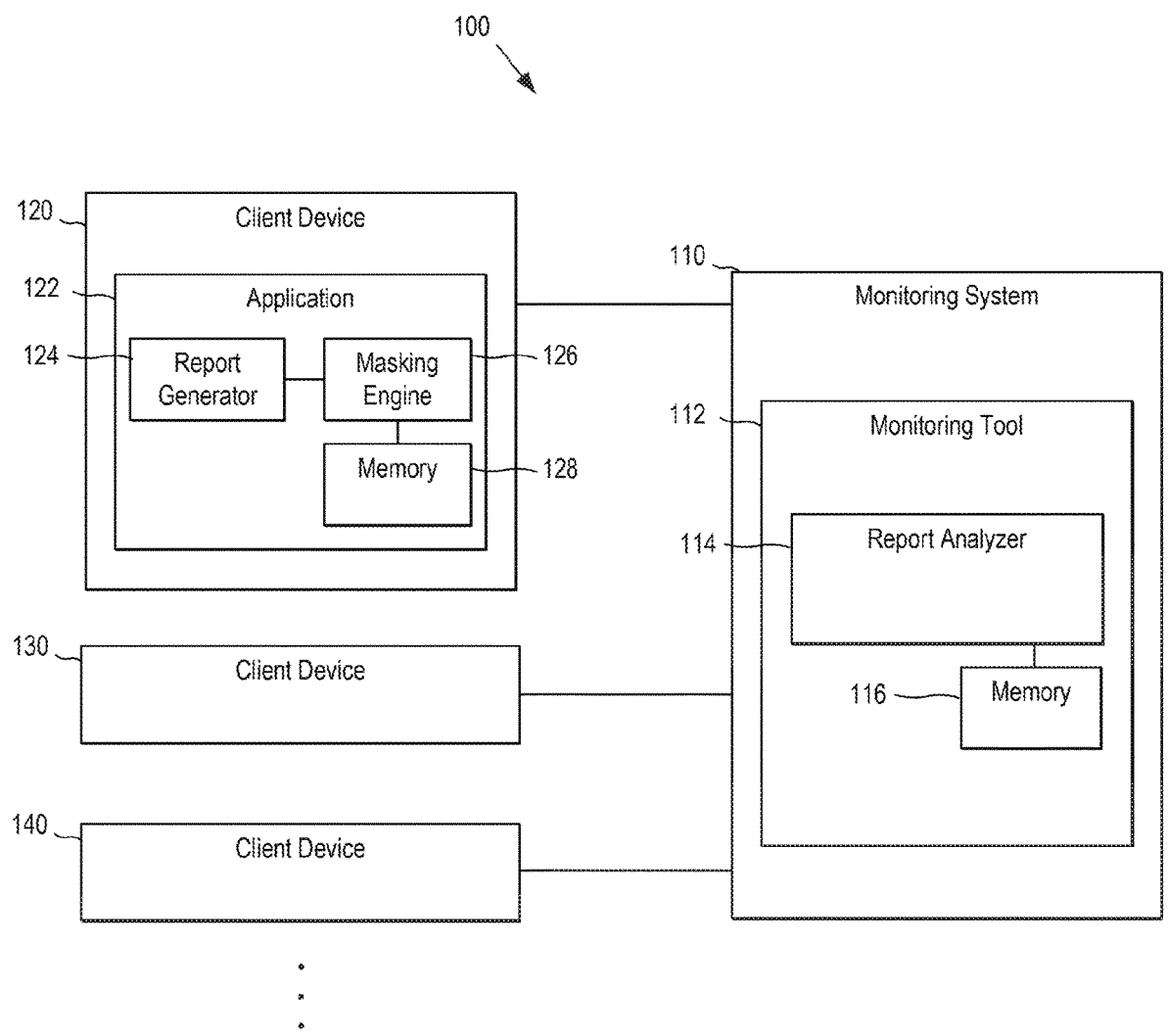
FIG. 1 is a block diagram of an example computing system.

As mentioned above, capturing information about the application's performance and execution may be useful to identify various issues, analyze user behavior, and improve the application accordingly. In some example, the information may be received from multiple devices in the form of reports. The reports may include, for example, information about actions or events related to the application's user interface (UI), such as when some a particular UI component was clicked or otherwise manipulated by the user, and how long it took the application to respond to the action. The reports may also include information unrelated to user interface, such as which modules or functions of the application were called with which parameters, how long it took the module or function to execute, how much space the application is occupying on the client device, or any other information associated with the performance and execution of the application. Thus, while for illustration purposes some of the following examples describe reports as containing information related to UI, it should be appreciated that the reports may include any other types of information related to the application, without limitation. As further discussed below, the information may be formatted as strings of characters, numbers, or any other suitable form.

Reports received from applications used by real users may sometimes include personal, confidential, or otherwise sensitive user information. For example, a UI component whose action or event is being reported may contain or be associated with user's personal information, such as a mailing address, account number, account balance, credit card number, email information (e.g., email subject), and the like. Personal information may be included in the component's display value, in which case it may be displayed on or near the component. For example, a text appearing on a button or a hyperlink may include a user's name, account number, and the like. Personal information may also be a part of the component's name or other identification information, such as the component's XML Path (Xpath). Reports describing events associated with various components may identify the components to the person monitoring the reports by the components' names, display values, or other identification information which may, as described above, contain personal information. This may pose a privacy concern for many users, as the users may not trust the developers or debuggers monitoring the reports.

Accordingly, it may be desirable for monitoring tools to receive and analyze reports related to UI components in a manner that protects user privacy. For example, it may be desirable to mask potentially personal information from the reports, and unmask (or stop masking) it when it is determined that the information is non-personal or unlikely to be personal. In some example, the determination of whether the information is likely to be personal is based on whether the same information is included in many reports originating from many client devices, as described in detail below. This is because personal information (e.g., a particular user's name, address, account number, etc.) is likely to be displayed on and reported by only a small number of devices, while non-personal information such as fixed or common strings (e.g., "Login," "My accounts," "Inbox," etc.) are likely to be displayed on (and reported by) a large number of devices.

Examples disclosed herein describe reports having one or more masked values. Such reports may preserve the user's privacy by not sending personal information over a network to a monitoring system unless and until it is determined that the information is non-personal. Examples disclosed herein describe, among other things, a monitoring system. The monitoring system may include a report analyzer configured to receive a report from one of a plurality of devices and determine whether the report includes at least one masked value. If the report includes at least one masked value, the report analyzer may be configured to determine, based on a plurality of reports associated with the masked value, whether an unmasking condition is satisfied, and if the unmasking condition is satisfied, to mark the masked value for unmasking.

FIG. 1 is a block diagram of an example computing system 100 for generating and analyzing reports that may contain masked values. Computing system 100 may include a monitoring system 110 and a number of client devices (e.g., 120, 130, 140, etc.). Each client device may provide, e.g., at a particular time or in response to a particular event, a report to monitoring system 110. Each report may include digital data such as attributes and values describing, for example, user-interface events and user-interface components associated with the events. In some examples, a report may include one or more masked values, as described in more detail below. In some examples, the client devices may provide the reports to the monitoring system 110 over at least one network. The network may be any combination of wired or wireless networks, wide-area and local-area networks, and may include any number of hubs, routers, switches, cell towers or the like. The network may be, for example, part of a cellular network, part of the Internet, part of an intranet and/or other type of network. Monitoring system 110 may receive, e.g., at particular times or in response to particular events, a plurality of reports from a plurality of client devices (e.g., 120, 130, 140, etc.).

A client device (e.g., 120, 130, 140, etc.) may include any suitable computing device complying with the principles disclosed herein. As used herein, a "computing device" may include a smartphone, cell phone, tablet, phablet, laptop, desktop, server, application-specific computing device, any other processing device or equipment, or a combination thereof. While client devices 120, 130, 140, etc. are described as "client" devices to indicate the client-server relationship between these devices and monitoring system 110, it should be appreciated that the term "client" is not limiting, and a client device can also serve as a server, for example, in the context of another application.

Client device 120 may be described specifically herein, but it should be understood that client devices 130, 140 and any other client in computing system 100 may be similar to client device 120 as described herein. Client device 120 may include an application 122 that runs on the client device 120. Application 122 may include instructions (e.g., stored on a machine-readable storage medium of client device 120) that, when executed (e.g., by a processor of client device 120), may implement the functionality of the application. Alternatively or in addition, application 122 may include electronic circuitry (i.e., hardware) that implements the functionality of the application. Application 122 may be any type of application, for example, a software program, web browser, web application, mobile application, or the like.

Client device 120 may include a report generator 124. Report generator 124 may generally represent any combination of hardware and programming. Report generator 124 may be included as part (e.g., a separate thread or process) of application 122 or may be independent of (e.g., in communication with) application 122. Report generator 124 may, at various times and/or in response to various events generate reports. The reports may include various error (e.g., crash) reports, status reports, user-interface event reports, and the like. In particular, user-interface event reports may include information about various events associated with user-interface components (hereinafter referred to as "UI components" or simply "components") such as buttons, text fields, combo boxes, radio buttons, hyperlinks, screens or windows, and the like. Events related to the components may include, for example, selecting (e.g., clicking or touching) the components, deselecting the components, changing the components' values, and the like.

Report generator 124 may include in the generated report one or more component attributes describing the component associated with the reported user-interface event. Component attributes may include the component's ID (e.g., its XML Path), type, screen on which the component appears, the component's location (e.g., coordinates) within the screen, and so forth. Component attributes may also include a display value associated with the component, such as a text displayed on or near the component. For example, if the component is a button, the display value may be the text displayed on the button (e.g., "Login").

In some examples, the report may also include other attributes associated with the reported event. Such other attributes may include an application response time indicating, for example, how long it took the application to respond to the event (e.g., process the event and update the screen accordingly). Other attributes may include the date and time of the event, any errors associated with the event, the screens displayed before and after event, and so forth.

In some examples, the report may also include user attributes such as a username or user ID, application attributes such as an application name and version, device attributes such as device ID, IP address, manufacturer, model, operating system, etc., and any other relevant attributes. The included attributes and their respective values may be formatted as strings, numbers, etc., and may be compressed and/or encrypted. FIG. 2A illustrates an example report 210 having multiple attribute—value pairs.

In some examples, after generating the report, report generator 124 may send the report to a masking engine 126. Masking engine 126 may generally represent any combination of hardware and programming. Masking engine 126 may be included as part (e.g., as a separate thread or process) of application 122 or report generator 124, or may be independent of (e.g., in communication with) application 122 and engine 124. Masking engine 126 may obtain the report from report generator 124 and determine whether at least one portion of the report, such as one or more values in included in the report (e.g., strings, numbers, etc.) are potentially personal and therefore should be masked. In some examples, masking engine 126 may determine that some types of values (e.g., event time, event type, device ID and other device information) are presumed (e.g., predefined) to be non-personal and therefore should not be masked, irrespective of their values. For every other type of value, masking engine 126 may determine whether or not the value is potentially personal and should be masked by accessing a memory, such as memory 128.

Memory 128 may include any type of volatile or non-volatile memory, such as a random-access memory (RAM), flash memory, hard drive, memristor-based memory, and so forth. Memory 128 may be located on client device 120, or it may be located on one or more other devices (e.g., monitoring system 110) and be accessible by and in communication with client device 120 and application 122. In some examples, memory 128 may be shared and accessible by a plurality of client devices (e.g., 120, 130, 140, etc.) and/or monitoring system 110. In other examples, each client device may have an independent instance of memory 128.

In some examples, memory 128 may store any values (e.g., strings, numbers, etc.) that have been determined to correspond (or likely to correspond) to non-personal data, as described in more detail below. Thus, in some examples, memory 128 may initially contain no values, meaning that all values may initially be considered as potentially personal. Accordingly, in some examples, masking engine 126 may access memory 128 and determine that a particular value of the report is not potentially personal (i.e., non-personal or public) if and only if the value is stored in memory 128. In some examples, instead of storing the values, memory 128 may store mapped versions of the values, such as masked values, further discussed below. In such examples, in order to determine whether a certain value is stored in memory 128, engine 126 may first map the value (e.g., using a masking value discussed below) and then determine whether the mapped value is stored in memory 128.

In some examples, memory 128 may store values (e.g. "My Accounts") in association (e.g., as part of the same record) with other information, such as the attribute associated with the value and the component attribute(s) (e.g., component ID) that was included in the same report with the value. In such examples, masking engine 126 may determine that a particular value is non-personal if and only if the value is stored in memory 128 in association with the other information, e.g., with association with the same attribute as the attribute associated with the value currently being processed, and in association with the same component attribute(s) as those included in the report currently being processed.

Some values of the report may include two or more strings, numbers, etc. For such values, engine 126 may consider each string, number, etc., within the value as a separate value, and independently determine (e.g., by accessing memory 128) whether that value is potentially personal. For example, for display value "Show details for account ending in '9876 (balance $1,234)", masking engine 126 may independently determine whether any of the strings "John," "Doe," "account," "ending," "in," "'9876," "balance," and "$1,234," are potentially personal, as illustrated in the example of FIG. 2B, further discussed below. In other examples, however, masking engine 126 may not split such composite values, and make the determination of whether the value is potentially personal based on the entire value.

In some examples, if masking engine 126 determines some (e.g., one or more) values of the report are potentially personal, it may mask those original values by substituting them portion with masked values. In some examples, a masked value may be any value that is different from the original value such that the original value may not be ascertained or is difficult to ascertain based on the masked value alone. In some examples, masking engine 126 may map an original value into a masked value using a masking function. The masking function may be, for example, a deterministic single-valued function. In some examples, the function may be a deterministic one-to-one function, where any original value is mapped to exactly one masked value, and where different original values may not be mapped into the same masked value. In some examples, the masking function may be a non-invertible function meaning that there may be no de-masking function that would map the masked value back into the original value. In other examples, the masking function may be an invertible function and masking engine 126 may use an inverse function to determine the original value based on the masked value, if needed. In some examples, masking engine may also preprocess the original value before masking it, for example, by transforming the value into lowercase or uppercase, removing any white spaces, stemming the value, etc., to ensure that substantially similar original values are mapped to the same masked value.

In some examples, masking engine 126 may map original values into masked values using a hash function, such as a cryptographic hash function or other types of hash functions. In these examples, a masked value may be a hash value of the original value. To illustrate, FIG. 2B shows an example report 220 corresponding to report 210 after some values of report 210 have been masked by masking engine 126 using a hash function. In this example, engine 126 may have the following attributes by definition may not include potentially personal information: Username, Device ID, Event time, Event type, Component ID and Response time. Therefore, in this example, engine 126 did not mask those values. With regard to the screen-name value "My Accounts," engine 126 may have accessed memory 128 and determined that the value is stored in memory 128 (e.g., in association with the same component ID) and therefore is non-personal and should not be masked. Finally, with regard to the display value, engine 126 may have broken it down into individual strings and independently determined, for each string, whether it is stored in memory 128. Because strings "account," "ending," "in," and "balance," are common strings that are likely to be found in other reports from other users and devices, as further discussed below, in this example engine 126 is assumed to have found these strings in memory 128 (e.g., in association with the same component ID), and therefore did not mask them. On the other hand, strings "John," "Doe," "'9876," and "$1,234" are not common to other users and in this example are assumed to be absent from memory 128. Accordingly, in this example engine 126 masked these strings by substituting them with masked values (in this example, 32-bit hash values generated based on the original values using a hash function), as illustrated in FIG. 2B.

Referring back to FIG. 1, after masking engine 126 processes the report by masking any potentially personal values, masking engine may send the processed report (e.g., via client device 120 and via one or more networks) to monitoring system 110. Other client devices (e.g., 130, 140, etc.) may similarly generate and process reports by masking any potentially personal values, and provide the processed reports to monitoring system 110. In some examples, all client devices may use the same masking function to map original values into masked values such that same original values are mapped to same masked values, irrespective of the client device (or the masking engine) performing the masking.

Monitoring system 110 may include at least one computing device that is capable of obtaining a plurality of reports from a plurality of client devices (e.g., 120, 130, 140, etc.), each report being received from and associated with one of the client devices. The term "system" may be used to refer to a single computing device or multiple computing devices that communicate with each other (e.g., via a network) and operate together to provide a service. In some examples, monitoring system 110 may include a monitoring tool 112 that runs on monitoring system 110.

Monitoring tool 112 may be any type of application testing tool (e.g., a real user monitoring tool) that receives execution information (e.g., information about execution, events, errors, performance issues, etc.) from various applications (e.g., 122) running on various client devices (e.g., 120, 130, 140, etc.). Monitoring tool 112 may include instructions (e.g., stored on a machine-readable storage medium of system 110) that, when executed (e.g., by a processor of system 110), implement the functionality of the monitoring tool 112. Alternatively or in addition, monitoring tool 112 may include electronic circuitry (i.e., hardware) that implements the functionality of the monitoring tool 112. Monitoring system 110 may include a report analyzer 114, which may be included as part of monitoring tool 112 or may be independent of (e.g., in communication with) monitoring tool 112.

Report analyzer 114 may generally represent any combination of hardware and programming configured to receive one or more reports from one or more devices such as client devices (e.g., 120, 130, 140, etc.). In particular, analyzer 114 may receive a report from an application 122 running on a client device (e.g., 120, 130, 140, etc.). After receiving a report from a client device, analyzer 114 may, among other things, analyze the report, display the report to the user (e.g., on a display coupled to monitoring system 110), and store the report information in a memory, such as memory 116.

Memory 116 may include any type of volatile and/or non-volatile memory (e.g. RAM, flash memory, hard drive, memristor-based memory, etc.) and may be located either on monitoring system 110 or on another system that is remotely accessible (e.g., via at least one network) by monitoring system 110. Memory 116 may store information about received reports, such as detailed or summary information of all or some of the received reports.

Alternatively or in addition, memory 116 may store statistical information about the reports. For example, analyzer 114 may group received reports based on a common UI component, e.g., assign any reports including the same component ID, display value, screen name, etc., to the same group. If some of the values required for grouping are masked, analyzer 114 may nevertheless group reports based on the masked values, because, as discussed above, each client device (e.g., 120, 130, 140) may use the same masking function, mapping matching identifiers into matching masked values. For each group of reports, analyzer 114 may store in memory 116 group statistics, such as the total number of reports in the group, the number of unique users or devices associated with the reports in the group, the average response time among the reports in the group, and so forth.

Alternatively or in addition, memory 116 may store statistical information about the various masked values. Statistical information stored for a particular masked value may include any detailed or summary information about any received report containing the particular value. For example, for each masked value, memory 116 may store the total number of received reports containing the value, a list and/or number of various users or client devices from which the reports containing the value were received, a list and/or number of various geographical regions (e.g., countries, states, cities, etc.) from which the reports were received, and so forth. In some examples, after receiving a new report, report analyzer 114 may update in memory 116 any statistical information related to reports, masked values, etc.

When report analyzer 114 receives a new report from one of a plurality of client devices (e.g., 120, 130, 140, etc.), report analyzer 114 may determine whether the new report includes at least one masked value. As described above, a masked value may be any value that is different from an original value in a way that makes it difficult or impossible to determine the original value based on the masked value alone. For example, the masked value may be a mapped (e.g., hashed), obfuscated, edited, or otherwise modified version of the original value, as described above. Report analyzer 114 may identify masked values within the new report, for example, by detecting any values that are formatted in accordance with a predefined format, located at predefined positions within the report, marked with special predefined tags or markers, or using any other suitable ways.

If the new report includes at least one masked value, report analyzer 114 may determine for each identified masked value whether an unmasking condition is satisfied, meaning that the masked value should no longer be masked, because it likely corresponds to a non-personal value. In some examples, report analyzer 114 may determine whether the unmasking condition for a particular masked value is satisfied based at least on statistical information associated with a plurality of received reports (e.g., including or excluding the new report) associated with the masked value. In some examples, a plurality of reports associated with the masked value (also referred to as "associated reports") may include any reports having the masked value in any of their attributes. In other examples, associated reports may include any reports having the masked value in the same attribute as the report currently being processed. In yet other examples, associated reports may include any reports having the masked value in the same attribute as the current report and having the same additional attribute(s) (e.g., same component ID) as the current report.

Statistical information associated with the associated reports may be stored in memory 116 or may be generated by report analyzer 114 based at least on the report information stored memory 116. As described above, report analyzer 114 may obtain the statistical information and use it to determine whether an unmasking condition for a particular masked value is satisfied. The unmasking condition may include one or more conditions that may be predefined and/or configurable, e.g., by the user(s) of monitoring system 110.

In some examples, the unmasking condition may include a condition that the plurality of reports associated with the masked value (the "associated reports") includes at least T total reports, where T is a predefined and/or configurable number. Alternatively or in addition, the unmasking condition may include a condition that the number of associated reports is at least P percent from all the received reports, where P is a predefined and/or configurable number. Alternatively or in addition, the unmasking condition may include a condition that the associated reports were received from at least U1 different client devices and/or from at least U2 different users, where U1 and U2 are predefined and/or configurable numbers. Alternatively or in addition, the unmasking condition may include a condition that the associated reports were received from at least L different geographic locations (e.g., countries, states, regions, zip codes, etc.) where L is a predefined and/or configurable number, and where a report's location may be determined, for example, based on the IP addresses of the reporting device, or based on location attribute(s) (e.g., address, GPS coordinates) included in the report. In addition to the example conditions provided above, it is appreciated that the unmasking condition may include any other conditions. It is also appreciated that the unmasking condition may combine one or more conditions (e.g., using logical "AND" or "OR" operations). For example, an unmasking condition may be that a particular masked value was included in at least 2% of all reports or in at least 30% of any reports for a particular UI component on a particular application screen, and that at least 100 of those reports were received from different client devices and different users.

As discussed above, because personal data, such as personal names, addresses, account numbers, email text, etc., is unlikely to be entered by or displayed to many different users on many different client devices, if many different users or client devices report the same masked value, such masked value is unlikely to correspond to personal value. Instead, such value is likely to correspond to a non-personal value such as a standard (e.g., fixed) text included on application screens for many or all users. Accordingly, the unmasking condition that includes one or more minimum thresholds, such as the threshold described above, is likely to be eventually satisfied for masked values corresponding to non-personal data, because such masked values are likely to be reported by numerous users, numerous devices, from numerous geographic locations, etc. Because in some examples the user or the developer of monitoring tool 112 may dynamically change the unmasking condition, the user may adjust the condition such that most or all of non-personal data satisfies the unmasking condition, while most or all of personal data does not satisfy the unmasking condition.

If report analyzer 114 determines that the unmasking condition for a particular masked value is satisfied, report analyzer 114 may mark the masked value for unmasking, that is, mark it as a non-personal value that should no longer be masked. The marking may include any action by report analyzer 114 (e.g., sending a signal or notification, updating a memory, etc.) based on which one or more client devices (e.g., 120, 130, 140) may determine that the particular masked value is non-personal and should no longer be masked. For example, marking the masked value for unmasking may include notifying at least one of (or all) client devices (e.g., 120, 130, 140, etc.) that the masked value (or the corresponding original value) should be marked for unmasking. For example, monitoring system 110 may send a notification to at least one of (or all) client devices, where the notification may include the masked value and any other related information such as information identifying the report. In some examples, monitoring system 110 may send the notification only to the client device from which the new (e.g., the most recently received) report was received. After receiving the notification, the client device(s) may mark the masked value as non-personal, for example, by storing the masked value in a memory (e.g., memory 128). Alternatively or additionally, the client device(s) may first obtain an original value based on the masked value (e.g., using an inverse function to the masking function, if the masking function is invertible), and store the original value in the memory (e.g., memory 128).

As another example, report analyzer 114 may mark the masked value for unmasking by storing the masked value in a memory, such as memory 116, without sending a notification to the client device(s). In such examples, client device(s) may access the memory (e.g., via at least one network) to determine whether a particular value is stored in the memory.

As described above, after the memory (e.g., memory 128 or memory 116) is updated to store the masked value and/or the corresponding original value, the next time a client device (e.g., 120, 130, 140, etc.) generates a report containing the corresponding original value, the client device may access the memory (e.g., directly or via a network), determine that the memory contains the original value or the corresponding masked value, and based on that determination, the client device may not mask the corresponding original value.

Thus, in some examples, sometime after marking a particular value for unmasking, monitoring system 110 may receive one or more new reports from one or more client devices containing the particular value in its original, unmasked form. Put differently, after a particular value is marked for unmasking, the next time that value is included in a report from a client device, the report will include the unmasked version of the value.

In foregoing discussion, report generator 124, masking engine 126, and report analyzer 114 were described as any combinations of hardware and programming. Such components may be implemented in a number of fashions. The programming may be processor executable instructions stored on a tangible, non-transitory computer readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer readable medium can be said to store program instructions that when executed by the processor resource implement the functionality of the respective component. The computer readable medium may be integrated in the same device as the processor resource or it may be separate but accessible to that device and the processor resource. In one example, the program instructions can be part of an installation package that when installed can be executed by the processor resource to implement the corresponding component. In this case, the computer readable medium may be a portable medium such as a CD, DVD, or flash drive or a memory maintained by a server from which the installation package can be downloaded and installed. In another example, the program instructions may be part of an application or applications already installed, and the computer readable medium may include integrated memory such as a hard drive, solid state drive, or the like.

Figure 3:
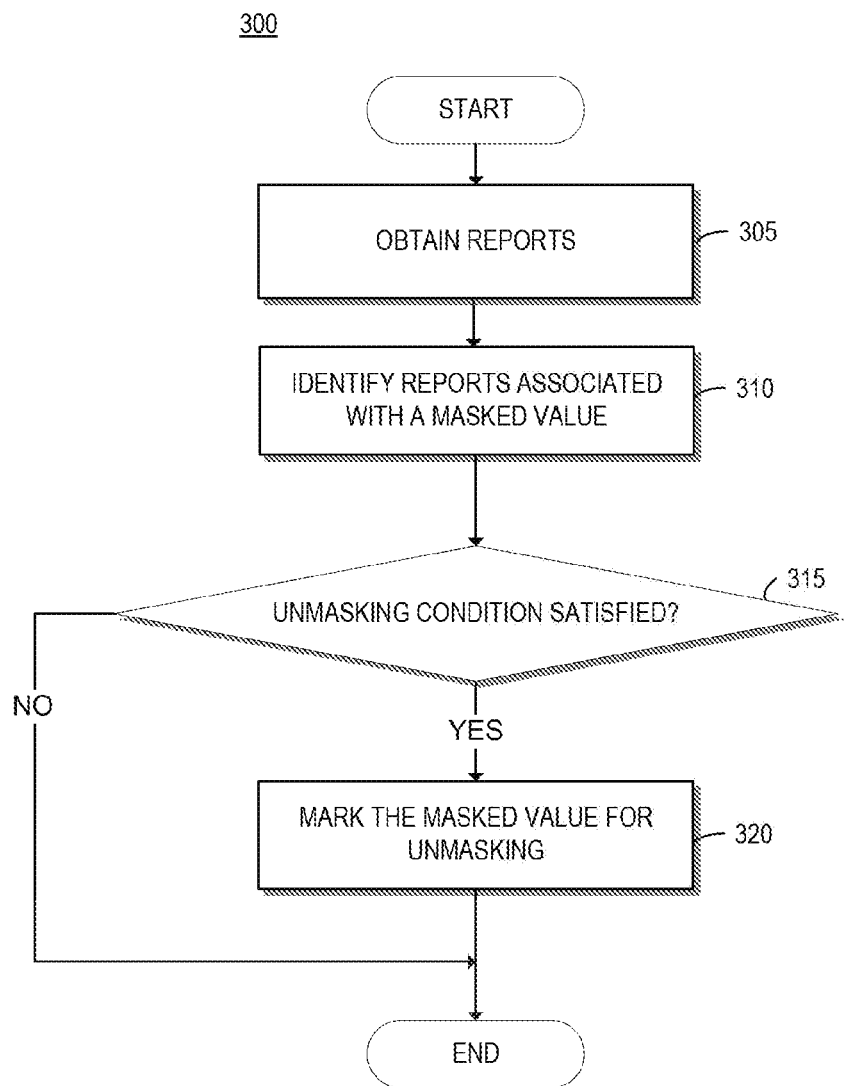
FIG. 3 is a flowchart of an example method for identifying and unmasking masked value(s)

FIG. 3 is a flowchart of an example method 300 for identifying and unmasking masked value(s). Method 300 may be described below as being executed or performed by a system, for example, monitoring system 110 of FIG. 1. Other suitable systems and/or computing devices may be used as well. Method 300 may be implemented in the form of executable instructions stored on at least one non-transitory machine-readable storage medium of the system and executed by at least one processor of the system. Alternatively or in addition, method 300 may be implemented in the form of electronic circuitry (e.g., hardware). In alternate examples of the present disclosure, one or more or blocks of method 300 may be executed substantially concurrently or in a different order than shown in FIG. 3. In alternate examples of the present disclosure, method 300 may include more or less blocks than are shown in FIG. 3. In some examples, one or more of the blocks of method 300 may, at certain times, be ongoing and/or may repeat.

At block 305, method 300 may obtain a first plurality of reports (e.g., two or more reports), where each report is associated with at least one from a plurality of client devices (e.g., 120, 130, 140, etc.). For example, the first plurality of reports may be received from the plurality of client devices over one or more networks.

At block 310, the method may identify, within the first plurality of reports, a second plurality of reports (e.g., two or more reports) that are associated with the same masked value. As described above, the second plurality of reports may include any reports from the first plurality that contain the masked value in any of their attributes. In other examples, the second plurality of reports may include any reports from the first plurality that contain the masked value and in which the masked value is associated with (e.g., corresponds to) the same attribute. In yet other examples, the second plurality of reports may include any reports from the plurality of reports that contain the masked value, in which the masked value is associated with the same attribute, and which contain some of the same additional attribute(s), such as component ID.

At block 315, the method may determine based at least on the second plurality of reports whether an unmasking condition is satisfied, as described above. If the unmasking condition is satisfied, the method may proceed to block 320. If the unmasking condition is not satisfied, the method may end.

At block 320, the method may mark the masked value for unmasking, as described above. For example, the method may send the masked value to a client device associated with at least one of the second plurality of reports. The method may also obtain (e.g., receive) from the client device a new report that include the original value associated with (e.g., corresponding to) the unmasked value. As described above, the unmasked value may, in some examples, be a hash value of the original value. After block 320, the method may end. In some examples, after the method ends, the method may be performed again, for example, on another masked value.

Figure 4:
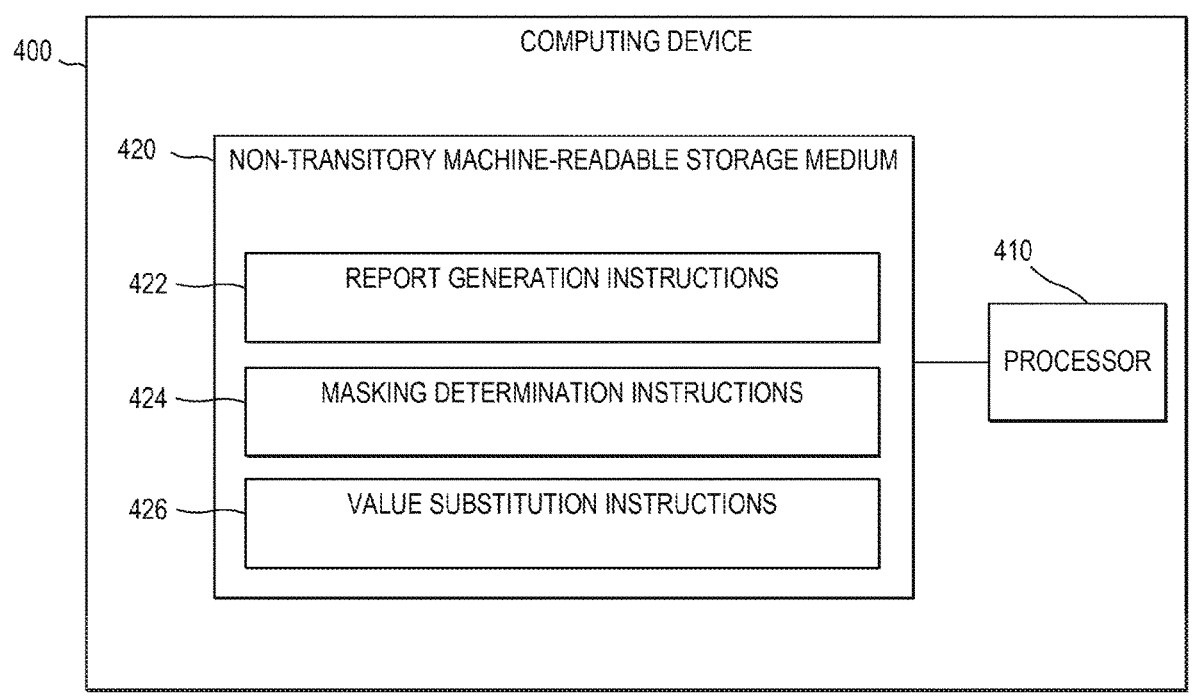
FIG. 4 is a block diagram of another example computing device.

FIG. 4 is a block diagram of an example computing device 400 for generating reports. Computing device 400 may be similar to a client device (e.g., 120, 130, 140, etc.) of FIG. 1. In the example of FIG. 4, computing device 400 includes a processor 410 and a non-transitory machine-readable storage medium 420. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 410 may be one or more central processing units (CPUs), microprocessors, and/or other hardware devices suitable for retrieval and execution of instructions stored in non-transitory machine-readable storage medium 420. In the particular example shown in FIG. 4, processor 410 may fetch, decode, and execute instructions 422, 424, 426, or any other instructions (not shown for brevity) to generate one or more reports. As an alternative or in addition to retrieving and executing instructions, processor 410 may include one or more electronic circuits comprising a number of electronic components for performing the functionality of one or more of the instructions in machine-readable storage medium 420. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Non-transitory machine-readable storage medium 420 may be any electronic, magnetic, optical, or other physical storage device that stores executable instructions. Thus, medium 420 may be, for example, Random Access Memory (RAM), an Electrically-Erasable Programmable Read-Only Memory (EEPROM), a storage drive, an optical disc, and the like. Medium 420 may be disposed within computing device 400, as shown in FIG. 4. In this situation, the executable instructions may be "installed" on computing device 400. Alternatively, medium 420 may be a portable, external or remote storage medium, for example, that allows computing device 400 to download the instructions from the portable/external/remote storage medium. In this situation, the executable instructions may be part of an "installation package". As described herein, medium 420 may be encoded with executable instructions for generating report(s).

Referring to FIG. 4, report generation instructions 422, when executed by a processor (e.g., 410), may cause a computing device (e.g., 400) to generate a report associated with a user-interface event, where the report may include at least one value, which may, in some examples, include a display value of a component associated with the user-interface event, as described above. Masking determination instructions 424 may cause the computing device to access a memory to determine whether the value is to be masked. For example, as described above, determining whether the value is to be masked may include accessing a memory (e.g., directly access a local memory or access a memory stored on another device via a network) and determining whether the memory includes the value. If it is determined that the value is to be masked, value substitution instructions 426 may cause the computing device to substitute the value with a masked value in the report. As described above, the masked value may be, for example, a hash value generated based on the value.

In some examples, medium 420 may include additional instructions that may, for example, cause the computing device to send the generated report to a monitoring system (e.g., 110), to receive from the monitoring system a notification that includes the masked value, and after receiving the notification, to send to the monitoring system a new report that includes the (unmasked) value. Additional instructions may also cause the computing device to store the unmasked value, the masked value, or both in the memory.

The invention claimed is:

1. An apparatus comprising:
a processor; and
a non-transitory machine-readable medium on which is stored instructions that, when executed by the processor, cause the processor to:
generate a first report on a first performance of an application at a client device, the first report comprising a first value;
access a memory to determine whether the first value in the first report matches any values stored in the memory, wherein the memory stores only values that have been determined to be public or non-personal information of users of the application and the values stored in the memory are not to be masked in reports;
in response to a determination that the first value in the first report does not match any values stored in the memory, determine whether the first value in the first report is personal information of a user of the client device;
in response to a determination that the first value is personal information of the user of the client device, determine that the first value in the first report is to be masked;
in response to the determination that the first value in the first report is to be masked, substitute the first value in the first report with a masked value; and
send the first report with the masked value to a monitoring system that receives a plurality of reports on performances of the application from a plurality of client devices.

2. The apparatus of claim 1, wherein to substitute the first value, the instructions, when executed by the processor, cause the processor to:
generate the masked value based on a cryptographic hash of the first value.

3. The apparatus of claim 1, wherein the instructions, when executed by the processor, further cause the processor to:
after sending the first report having the masked value to the monitoring system, receive from the monitoring system a notification indicating that the masked value is to be unmasked; and
after receiving the notification, send to the monitoring system a new report in which the masked value is substituted with the first value that is not masked.

4. The apparatus of claim 3, wherein the instructions, when executed by the processor, further cause the processor to:
after receiving the notification, store the first value that is not masked in the memory.

5. The apparatus of claim 1, wherein the first value that is not masked comprises a display value on a user interface.

6. The apparatus of claim 5, wherein the display value comprises text appearing in a button or a hyperlink of the user interface.

7. The apparatus of claim 6, wherein the first report is an event report relating to the user interface in response to a user interaction with the button or the hyperlink.

8. A non-transitory machine-readable storage medium on which is stored instructions that, when executed by a processor cause the processor to:
generate a first report on a first performance of an application at a client device, the first report comprising a first value;
access a memory to determine whether the first value in the first report matches any values stored in the memory, wherein the memory stores only values that have been determined to be public or non-personal information of users of the application and the values stored in the memory are not to be masked in reports;
based on a determination that the first value in the first report does not match any values stored in the memory, determine whether the first value in the first report is personal information of a user of the client device;
in response to a determination that the first value is personal information of the user of the client device, determine that the first value in the first report is to be masked;
mask the first value in the first report by substituting the first value in the first report with a masked value; and
send the first report with the masked value to a monitoring system that receives a plurality of reports on performances of the application from a plurality of client devices.

9. The non-transitory machine-readable storage medium of claim 8, wherein the masked value comprises a hash value of the first value.

10. The non-transitory machine-readable storage medium of claim 8, wherein the instructions, when executed by the processor, further cause the processor to:
after sending the first report having the masked value to the monitoring system, receive from the monitoring system a notification indicating that the masked value is to be unmasked; and
after receiving the notification, send to the monitoring system a new report in which the masked value is substituted with the first value that is not masked.

11. The non-transitory machine-readable storage medium of claim 10, wherein the instructions, when executed by the processor, further cause the processor to:
after receiving the notification, store the first value that is not masked in the memory.

12. The non-transitory machine-readable storage medium of claim 8, wherein the first value that is not masked comprises a display value on a user interface.

13. A method, comprising:
generating, by a processor, a first report on a first performance of an application at a client device, the first report comprising a first value;
accessing, by the processor, a memory to determine whether the first value in the first report matches any values stored in the memory, wherein the memory stores only values that have been determined to be public or non-personal information of users of the application and the values stored in the memory are not to be masked in reports;
in response to the first value in the first report not matching any values stored in the memory, determining, by the processor, whether the first value in the first report is personal information of a user of the client device;
in response to a determination that the first value is personal information of the user of the client device, determining that the first value in the first report is to be masked;
masking, by the processor, the first value in the first report by substituting the first value in the first report with a masked value; and
sending, by the processor, the first report with the masked value to a monitoring system that receives a plurality of reports on performances of the application from a plurality of client devices.

14. The method of claim 13, wherein the masked value is a hash of the first value.

15. The method of claim 14, further comprising:
generating a new report with the first value that is not masked instead of the masked value.

16. The method of claim 13, wherein the first value comprises a display value on a user interface and wherein generating the first report further comprises:
monitoring user interaction with the user interface;
detecting a user interface event based on the monitoring of the user interaction; and
generating the first report responsive to the detecting of the user interface event.

17. The method of claim 13, wherein the first value comprises a display value on a user interface, and wherein generating the first report further comprises:
monitoring user interaction with the user interface; and
generating the first report based on the monitoring of the user interaction.

18. The method of claim 13, further comprising:
after sending the first report having the masked value to the monitoring system, receiving from the monitoring system a notification indicating that the masked value is to be unmasked; and
after receiving the notification, sending to the monitoring system a new report in which the masked value is substituted with the first value that is not masked.

19. The method of claim 18, further comprising:
after receiving the notification, storing the first value that is not masked in the memory.

\* \* \* \* \*